United States Patent Office 3,496,131
Patented Feb. 17, 1970

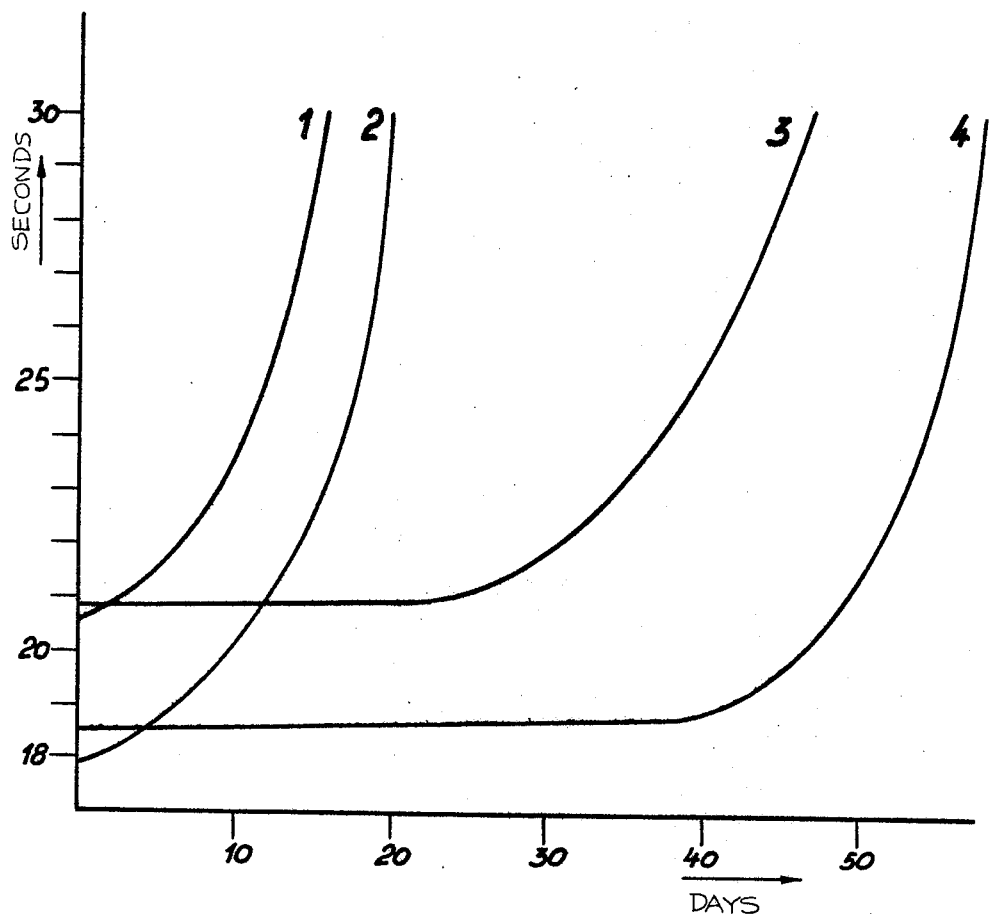

3,496,131
MELAMINE RESIN SOLUTION STABILIZED
WITH CYANAMIDE
Paul Bornmann and Horst Michaud, Trostberg, Germany,
assignors to Suddeutsche Kalkstickstoff-Werke Aktiengesellschaft, Trostberg, Germany
Filed Jan. 10, 1967, Ser. No. 608,399
Claims priority, application Germany, Jan. 11, 1966,
S 101,383
Int. Cl. C08g 51/60
U.S. Cl. 260—29.4         2 Claims

ABSTRACT OF THE DISCLOSURE

An aqueous melamine-formaldehyde solution is stabilized with cyanamide preferably in an amount of from 0.3 to 3 percent by weight, based on the amount of aminoplast forming components.

This invention relates to stabilized solutions of melamine resins.

Aqueous solutions of melamine resins are known to have only a limited storage life. When such solutions are left standing, their viscosity increases relatively fast, and on prolonged storage, insoluble compounds are precipitated so as to render the solutions useless for further applications.

Such solutions of aminoplasts have been rendered more stable by addition, e.g., of toluene sulfonamide, aliphatic nitro compounds, or sodium dithionite. In order to obtain the desired effect, said stabilizers have to be added in relatively large amounts and modify the properties of the resins. In addition, said stabilizers act differently depending on the formaldehyde content of the melamine resin solutions.

It is a principal object of the invention to provide a stabilizer which gives good results in small amounts and independently of the character of the melamine resin solution, and which does not affect the specific properties of the resin.

Other objects and advantages will be apparent from a consideration of the specification and claims.

In accordance with the invention, we use cyanamide as stabilizer, preferably in amounts of 0.3 to 3 percent by weight, calculated on the amount of the aminoplast forming components. In the stabilized resin solutions, up to 20 percent by weight of the melamine can be replaced by other compounds forming aminoplasts, such as urea, thiourea, dicyanodiamide, guanidine, benzoguanamine.

The amount of cyanamide required for stabilization depends, to a certain extent, on the time of addition. While an addition of about 1 percent of cyanamide is generally sufficient towards the end of the condensation, the amount may have to be increased up to 3 percent at the start of the condensation, e.g. when the cyanamide is added together with the melamine. We assume that under the latter circumstances, part of the added cyanamide is bound by free formaldehyde, and that, therefore, a larger amount has to be added to ensure presence of a sufficient amount of free cyanamide over the whole period of condensation. For this reason, we prefer to add the cyanamide only after the melamine has been dissolved, for instance about 15 minutes after the addition of the latter.

When the cyanamide is added after the condensation has been completed, for instance after several days, its amount should be kept below 1 percent by weight, so as to avoid modifications of the end product which might take place under extreme curing conditions.

Resins which are prepared by condensation of 1 mole of melamine with 2.8 moles of formaldehyde, show the following storability as a function of the time at which the stabilizer is added.

TABLE

| Stabilizer added | None | 1% of cyanamide | | | |
|---|---|---|---|---|---|
| | | Together with melamine | 20 min. after start of condensation | At the end of condensation | After 10 days storage of resin solution |
| Storability of resin solution in days | 20 | 58 | 65 | 75 | 61 |

Storability of the resin solution (at a temperature of 20° C.) is defined as the time during which the viscosity of the resin remains below 30 seconds (Ford cup, 4 mm. 20° C.) or during which the resin has not formed any noticeable amounts of precipitate.

It is generally known that melamine-formaldehyde resins with a low formaldehyde mole ratio have a lower storability than those having a higher formaldehyde content. Stabilizers which are effective for resins having a high content of formaldehyde tend to lose their effectiveness completely in resins of low formaldehyde content. Cyanamide is a good stabilizer in both cases. With an addition up to 3 percent by weight, calculated on the aminoplast forming component, the storability of the aqueous resin solution is increased two to five times.

A particular advantage of cyanamide is that it does not modify the initial viscosity of the resin (for equal amounts of solids) and that said initial viscosity remains constant for a considerable period of time. This relationship is illustrated in the accompanying drawing where the increase of viscosity of two types of melamine resins stored at 20° C. is plotted against time. Curves 1 and 2 refer to a resin of a melamine-formaldehyde ratio of 1:2.0 and 1:2.8, respectively, without addition of cyanamide, and curves 3 and 4 refer to the same two resins, respectively, each with addition of 1% of cyanamide, calculated on the resin. The viscosity was measured in a Ford cup under the conditions set forth hereinabove.

Cyanamide may be designated a universal stabilizer for melamine-formaldehyde resins. A stabilizing effect is always obtained, no matter in which mole proportions or at which temperature the melamine is reacted with formaldehyde and whether the reaction is carried out at a constant or decreasing pH. Resins made from different melamine grades are equally stabilized by the addition of cyanamide.

The cyanamide may be added in form of the solid pure compound or also as an aqueous solution. The most favorable amount may be taken from the following table prepared for a mole ratio of melamine:formaldehyde=1:2.8.

| Percent cyanamide added (calc. on melamine) | 0 | 0.005 | 0.01 | 0.05 | 0.1 | 0.5 | 1.0 |
|---|---|---|---|---|---|---|---|
| Storability (days) | 19 | 22 | 23 | 23 | 25 | 34 | 75 |

| Percent cyanamide added (calc. on melamine) | 1.5 | 2.0 | 3.0 | 5.0 | 10.0 | 15.0 | |
|---|---|---|---|---|---|---|---|
| Storability (days) | 60 | 38 | 24 | 18 | 15 | 12 | |

The following examples are given to illustrate the invention. The figures given for the ageing properties are always the average of a test series.

EXAMPLE 1

Resin preparation at mole ratio 1:2.8 and contant pH (9.0)

700 parts by volume of a 30% aqueous formaldehyde solution were adjusted to a pH of 8.8 with sodium hydroxide, and the mixture was heated at 70° C. After addition of 350 parts by weight of melamine and 3.5 parts by weight of cyanamide, condensation was carried out at 90° C. The pH was maintained at 9.0 by addition of sodium hydroxide. The condensation was discontinued at a water compatibility of 1:1, and the pH value was adjusted to 10.5.

The storability of the resin was 58 days, while that of the same resin solution without addition of cyanamide was only 20 days.

EXAMPLE 2

Resin preparation at mole ratio of 1:2 and constant pH (9.0)

The preparation was as in Example 1 with the difference that the amounts of melamine and cyanamide, set forth therein, were added to 505 parts by volume of 30% formaldehyde.

Storability with cyanamide: 47 days.
Storability without cyanamide: 16 days.

EXAMPLE 3

Mole ratio 1:1.8; pH=9

455 parts by volume of a 30% aqueous formaldehyde solution were adjusted to a pH of 8.8 by addition of sodium hydroxide. After heating to 70° C., 350 parts of melamine were added, and the condensation was carried out at 90° C. The pH was maintained constant at 9.0 by addition of sodium hydroxide. After 20 minutes of reaction, 3.5 parts by weight of cyanamide were added. After the resin had obtained a water compatibility of 1:1, the condensation was stopped and the pH was adjusted to 10.5.

Storability with addition of cyanamide: 30 days.
Storability without addition of cyanamide: 6 days.

EXAMPLE 4

Mole ratio 1:1.7; pH=9.5

450 parts by volume of a 30% aqueous formaldehyde solution were adjusted to a pH of 8.8 by addition of sodium hydroxide. After the mixture had been heated up to 70° C., 350 parts by weight of melamine were added. Then the condensation was carried out at 90° C., whereby the pH was kept constant at 9.5 by addition of sodium hydroxide. After a water compatibility of 1:1 had been obtained and the pH had been adjusted to 10.5, the condensation was discontinued. The resin solution was cooled, and 7.0 parts by weight of cyanamide, dissolved in 7 parts by weight of water, were added.

Storability with addition of cyanamide: 15 days.
Storability without addition of cyanamide: 3 days.

EXAMPLE 5

Mole ratio 1:1.7, decreasing pH 430 parts by volume of a 30% aqueous formaldehyde solution were adjusted to a pH of 10.7 by addition of sodium hydroxide. The mixture was heated at 70° C., 350 parts by weight of melamine were added, and the condensation was carried out at 90° C. 3.5 parts by weight of cyanamide were added after 20 minutes, and the condensation was continued until the water compatibility was 1:1. The solution was adjusted to a pH of 10.5, and then cooled.

Storability with addition of cyanamide: 7 days.
Storability without addition of cyanamide: 2 days.

EXAMPLE 6

Urea and benzoguanamine modified melamine resin 1508 parts by volume of a 30% aqueous formaldehyde solution were adjusted to a pH of 8.8 by addition of sodium hydroxide, and 700 parts by weight of melamine, 83.5 parts by weight of urea, 51.6 parts by weight of benzoguanamine, and 7 parts by weight of cyanamide were added at 70° C. Then the condensation was carried out at a temperature of 90° C. and a pH of 9.5 until the water compatibility of the resin solution was 1:1.

Storability with addition of cyanamide: 105 days.
Storability without addition of cyanamide: 44 days.

Substantially the same results are obtained when, instead of urea and benzoguanamine, other aminoplast-forming compounds such as dicyanodiamide, thiourea, guanidine, acetoguanamine and others, are employed.

EXAMPLE 7

Mole ratio 1:2.4, decreasing pH 600 parts by volume of a 30% aqueous formaldehye solution were adjusted to a pH of 10.7 by addition of sodium hydroxide, and heated up to 70° C. After addition of 350 parts by weight of melamine, the condensation was carried out at 90° C. When the resin showed a water compatibility of 1:1, the pH was adjusted to 10.5, the solution was cooled, and 3.5 parts by weight of cyanamide were added.

Storability with addition of cyanamide: 49 days.
Storability without addition of cyanamide: 14 days.

EXAMPLE 8

Mole ratio 1:2.0; constant pH of 9.0

The procedure was as described in Example 2 with the difference that the cyanamide (3.5 parts by weight) was added only after the resin solution had been stored for 10 days at 20° C.

Storability with addition of cyanamide: 48 days.
Storability without addition of cyanamide: 16 days.

EXAMPLE 9

Mole ratio 1:2.0; constant pH of 9.0

The procedure was as described in Example 2 with the only difference being that the cyanamide was added after the condensation was terminated.

Storability with addition of cyanamide: 50 days.
Storability without addition of cyanamide: 16 days.

When a white decorative paper was impregnated with 120% of the thus obtained resin and molded on a phenol core for 10 minutes at a pressure of 80 kg./cm.$^2$ and a temperature of 150° C., the obtained laminate met the requirements of the German standards DIN–53799.

Cyanamide is a good stabilizer for melamine-formaldehyde resins having a melamine-formaldehyde mole ratio of 1:1.5 to 1:3.5, preferably 1:1.7 to 1:2.8.

We claim:
1. An aqueous melamine-formaldehyde resin solution containing 0.3 to 3 percent by weight, calculated on the amount of aminoplast forming components, of cyanamide as a stabilizer.
2. The resin solution as claimed in claim 1 wherein up to 20 percent of the melamine is replaced by a member selected from urea, thiourea, dicyanodiamine, guanidine, benzoguanamine, acetoguanamine and mixtures thereof.

References Cited

UNITED STATES PATENTS 2,662,868  12/1953  Kaess et al. _____ 260—70
2,785,149  3/1957  Wohnsiedler _____ 260—67.6

WILLIAM H. SHORT, Primary Examiner

T. PERTILLA, Assistant Examiner

U.S. Cl. X.R.

260—67.6